United States Patent
Egger

(10) Patent No.: US 7,857,879 B2
(45) Date of Patent: Dec. 28, 2010

(54) DROPLET SEPARATOR

(75) Inventor: Daniel Egger, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 469 days.

(21) Appl. No.: 11/982,966

(22) Filed: Nov. 6, 2007

(65) Prior Publication Data
US 2008/0110140 A1    May 15, 2008

(30) Foreign Application Priority Data
Nov. 13, 2006  (EP) .................... 06123900

(51) Int. Cl.
*B01D 50/00* (2006.01)
(52) U.S. Cl. .................. 55/337; 55/456; 55/457; 55/321; 55/423; 96/355; 96/188; 96/192; 96/268; 96/269; 95/268; 95/270; 123/198 E
(58) Field of Classification Search .............. 55/337, 55/456, 457, 449, 321, 423; 96/355, 188–192, 96/268, 269; 95/268–270
See application file for complete search history.

(56) References Cited

U.S. PATENT DOCUMENTS

| 3,339,350 A | * | 9/1967 | Sims .......................... 55/320 |
| 3,349,548 A | * | 10/1967 | Boyen ........................ 55/457 |
| 3,822,533 A | * | 7/1974 | Oranje ........................ 55/394 |
| 4,361,490 A | * | 11/1982 | Saget ......................... 210/787 |
| 4,516,994 A | | 5/1985 | Kocher |
| 4,627,406 A | * | 12/1986 | Namiki et al. .............. 123/573 |
| 4,818,257 A | | 4/1989 | Kennedy |
| 6,190,438 B1 | * | 2/2001 | Parks ......................... 95/269 |
| 6,264,712 B1 | * | 7/2001 | Decker ....................... 55/456 |
| 7,531,018 B2 | * | 5/2009 | Becker et al. ................ 55/423 |
| 7,594,941 B2 | * | 9/2009 | Zheng et al. ................. 55/299 |
| 2002/0088347 A1 | * | 7/2002 | Kinsel ........................ 96/139 |
| 2005/0076621 A1 | * | 4/2005 | Chang ........................ 55/320 |
| 2007/0234691 A1 | * | 10/2007 | Han et al. .................... 55/457 |
| 2007/0240390 A1 | * | 10/2007 | Becker et al. ................ 55/423 |
| 2008/0047239 A1 | * | 2/2008 | Zheng et al. ................. 55/337 |

FOREIGN PATENT DOCUMENTS

| GB | 2 063 098 A | 6/1991 |
| WO | WO 99/52617 | 10/1999 |
| WO | WO01/80975 A1 | 11/2001 |
| WO | WO2004/009210 A1 | 1/2004 |

* cited by examiner

*Primary Examiner*—Jason M Greene
*Assistant Examiner*—Dung Bui
(74) *Attorney, Agent, or Firm*—Francis C. Hand; Carella, Byrne, Cecchi

(57) ABSTRACT

The droplet separator includes a vortex generating apparatus in a flow passage for directing a droplet-carrying gas in the direction of at least one separator element arranged concentrically about the flow passage. The separator element includes multiple grid-like structures for separating the droplets from the gas flow.

22 Claims, 9 Drawing Sheets

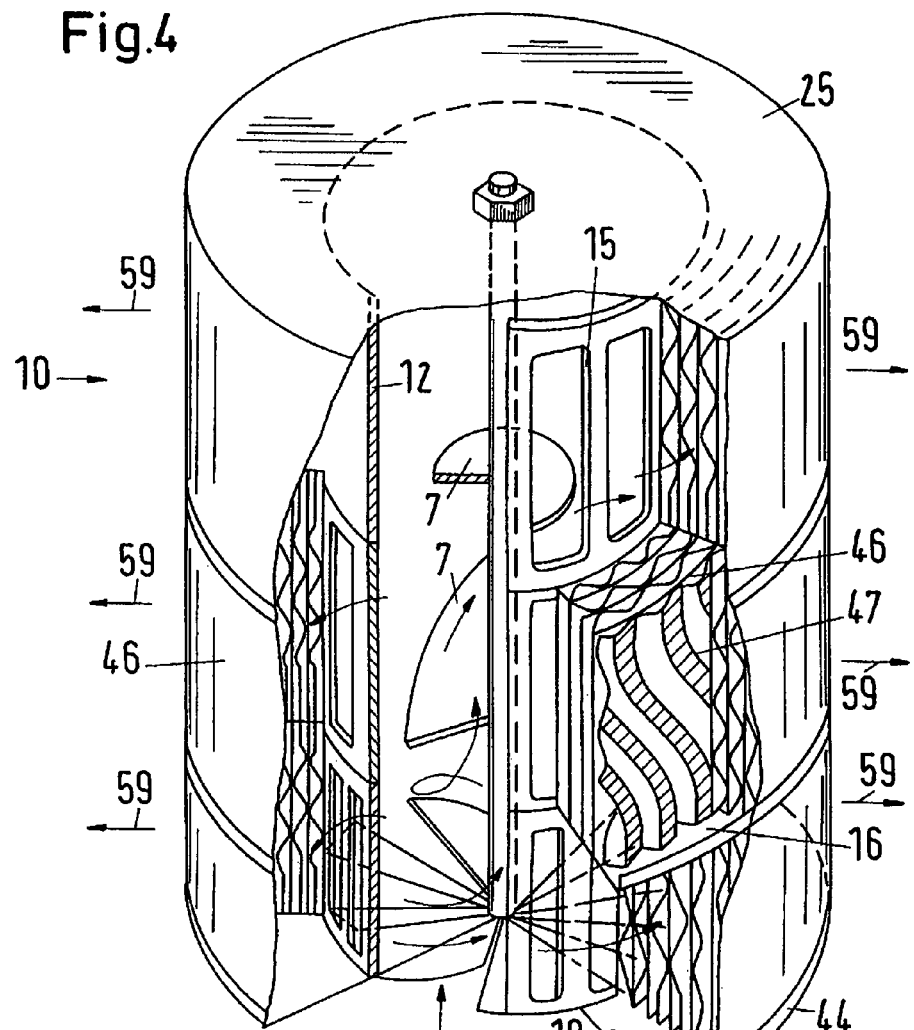
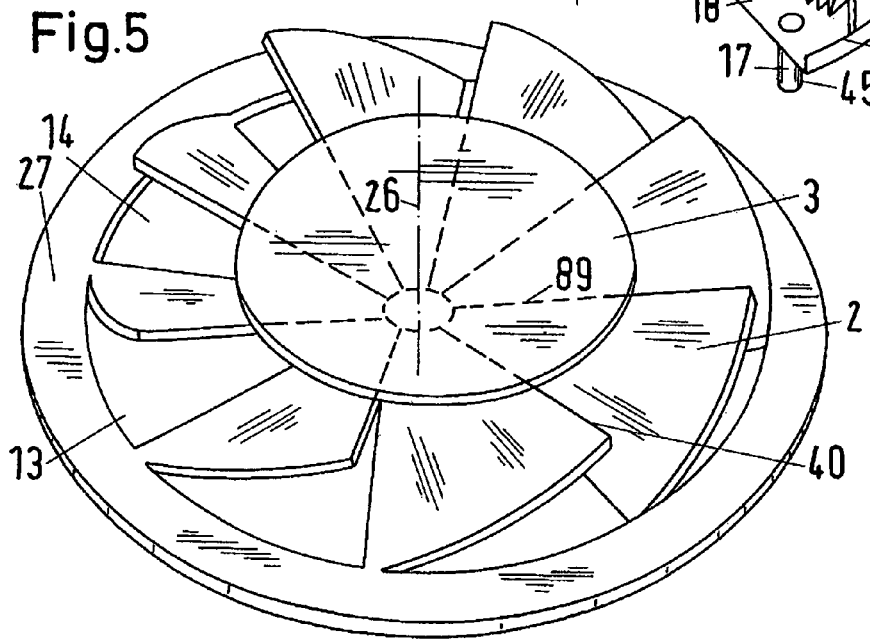

DROPLET SEPARATOR

This invention relates to a droplet separator. More particularly, this invention relates to a droplet separator having a vortex generating apparatus.

A droplet separator is known from EP-A-0 048 508 which includes a vortex generating apparatus for a fast-flowing gas flow or a multiple of modules each having an apparatus of this type. The modules or some of the modules are operated in parallel and are each separated from adjacent modules by walls. An inner jacket surface having the vortex generating apparatus is arranged inside each such module wall. The inner jacket surface has a horizontal inlet surface. Guide surfaces follow downstream which induce a rotation of the flow around a central axis in the gas flow flowing through the inner jacket surface. The central axis is vertically directed. Liquid carried along in droplet form by the gas flow is separated from the rotating flow by the inertia forces acting centrifugally on the inner surface of the inner jacket surface. Slots are provided in the inner jacket surface through which the separated liquid is transported into a collection space between the module wall and the inner jacket surface and from their further downwardly through drain pipes. A large part of the gas flow passes the inner jacket surface as a main flow, whereas a small part enters into the collection space as a secondary flow together with the separated liquid and is combined with the main flow again after a separation from the liquid. The guide surfaces are composed of individual sheet metal pieces to form a relatively complex and therefore expensive weld construction.

A further droplet separator is known from WO2004/073836 which is made up of similar modules as the separator in accordance with EP-A-0 048 508. The droplet separator consists of a tube piece at whose inlet baffles are arranged which induce a swirl flow. The incoming gas flow is set into strong rotation by means of the baffles, with liquid droplets being centrifuged outwardly, that is in the direction of the wall of a tube piece, by the centrifugal force and being separated as a liquid film there. The main portion of the tube flow is discharged upwardly through the outlet cross-section which has a diameter reduced with respect to the inlet cross-section. The liquid at the wall of the tube piece is discharged together with a part flow of the gas through slots which are arranged on the jacket surface of the tube piece into a ring passage arranged around the tube piece and collects by gravity on the base of the column from where it is led away though drain pipes. The part gas flow, which is very largely free of liquid, is recombined with the main gas flow through small openings in a cover plate. The cross-section surface of these openings determines the gas volume of the part flow.

It is the object of the invention to provide a droplet separator by means of which an improved separation of droplets, in particular of small droplets, can be achieved.

Briefly, the invention provides a droplet separator comprised of a jacket that defines a central flow passage for a flow of a droplet-carrying gas in a main flow direction; a vortex generation apparatus in the central flow passage for setting the droplet-carrying gas into a rotary movement whereby droplets in the droplet-carrying gas are directed by centrifugal force in a radial direction relative to the flow passage and at least some of the droplet-carrying gas is deflected from the main flow direction radially outwardly; and at least one annular separator element downstream of the vortex generation apparatus for receiving the droplet-carrying gas. The separator element further includes a plurality of grid-like structures for separating droplets from the droplet-carrying gas passing therethrough.

The separator element is arranged substantially in ring shape around the flow passage, has an inner jacket surface substantially having the diameter of the flow passage and includes openings for the entry of the droplet-carrying gas into the separator element. The separator element extends at least over a part of the length of the flow passage.

The vortex generating apparatus is arranged in the droplet separator for a fast-flowing gas flow and is arranged in the interior of the flow passage. The vortex generating apparatus includes a guide surface by means of which the droplet-carrying gas is set into rotary movement and the droplets can be directed in the direction of the separator element by centrifugal force. At least some of the droplet-carrying gas can be deflected from the main flow direction in the direction of the openings by means of the guide surface. A velocity component is thus generated in the radial and tangential direction with respect to the main flow direction by the rotary movement, whereby the deflection of at least some of the droplet-carrying gas occurs.

The separator element can be flowed through by the droplet-carrying gas from the inner jacket surface in the direction of a wall in a flow direction which includes an angle larger (>) than 0° and smaller (<) than 180° with respect to the main flow direction.

The separator element includes sections and/or is composed of a plurality of modules of separator elements which are connected sequentially in the main flow direction, with at least some of the deflected gas being able to be introduced through a section and/or module of the separator element disposed adjacent to the vortex generating apparatus, with some further deflected gas being able to be directed through a section and/or module of the separator element remote from the vortex generating apparatus.

In one embodiment, the grid-like structures are arranged in ring shape between the inner jacket surface and an outer wall substantially parallel to the inner jacket surface and/or to the outer wall.

In another embodiment, the grid-like structures are arranged between the inner jacket surface and an outer wall at an angle to the inner jacket surface and/or the outer wall, with the angle preferably lying between 30° and 70°, in particular between 45° and 60°.

In still another embodiment, the grid-like structures may open directly into the central passage.

Each of the grid-like structures belonging to a separator element is held by a base plate arranged substantially perpendicular to the main flow direction and the adjacent separator elements can be separated by the base plates. Liquid can be drawn off separately from each separator element by such base plates to avoid the already separated liquid from being carried along by the gas flow.

Each of the base plates can include collection means. On the one hand, the base plate can itself be made as a collection space so that the base plate has the function of a collection means; on the other hand, collection means can be configured as liquid-conveying structures, such as passages, which open into a drain pipe, whereby the liquid forming in all separator elements is introduced by means of the collection means into at least one drain pipe and is drawn off via a discharge stub arranged at an end of the drain pipe.

At least one mat for droplet coalescence can be disposed upstream in the gas flow before the vortex generating apparatus. This allows very small droplets to be separated on wettable surfaces in the mat and to be released into the gas flow again in larger shape due to shear forces generated by the gas flow.

The guide surfaces of the vortex generating apparatus are arranged within a tube piece upstream of the inner jacket surface around a central axis oriented in the main flow direction. The guide surfaces form an inlet opening with a ring-shaped outlet opening being provided downstream with respect to the inlet opening for the gas flow deflected by the guide surfaces.

All the guide surfaces include an angle of inclination with the inlet surface which is larger than 20° and smaller than 70° and preferably lies between 45° and 65°. The angle of inclination is variable along the edge from the tube piece to the central axis.

A deflection body can be arranged on the central axis so that the ring-shaped outlet area extends around the deflection body and the inner wall of the inner jacket surface.

In one embodiment, the guide surfaces are arranged between a centrally disposed disc having a predetermined outer diameter and an annular ring having a predetermined inner diameter. In this embodiment, each adjacent pair of the guide surfaces define an outlet with a cross-sectional area sufficient to induce a rotational flow in the gas flow around the central axis due to a combined effect through the deflection body and the guide surfaces. In addition, the guide surfaces are each bent from a plane downstream around two torsion points.

One half of the torsion points is arranged on the inner diameter of the annular ring on a first regular polygon, the other half of the torsion points is arranged on the outer diameter of the disc on a second regular polygon. The guide surfaces are produced from a planar metal sheet by means of gap-shaped openings. The gap-shaped openings are made, for example, by means of a laser cutting process, by wire erosion or by stamping. The torsion points each have a three-dimensional surrounding space which separates the gap-shaped openings of adjacent guide surfaces.

The inner diameter of the annular ring has a value between 50 and 300 mm, preferably between 150 and 250 mm.

The deflection body is configured in a conical or plate shape and the outlet area determined by the deflection body is at least 20% smaller than the inlet area, preferably 30 to 40% smaller.

The number of the guide surfaces is larger than 3 and smaller than 13, and preferably amounts to 6, 8 or 10.

All the guide surfaces include an angle of inclination with the inlet area which is larger than 20° and smaller than 70° and preferably lies between 45° and 65%.

In accordance with a further embodiment, each guide surface is curved or has at least two planar part surfaces which are inclined with respect to one another. The movement of the gas flow can be influenced more favourably with such a shape than with planar guide surfaces, in particular with respect to the relationship between swirl generation and pressure droplet between the named inlet and outlet openings.

The deflection body is preferably configured in a conical shape and has a cone angle which matches the upper edges of the guide surfaces which are generated by radial sections of the gap-shaped openings so that respective contact lines results between the deflection body and the edges in the central region surrounded by the outlet surface.

Droplet separators in this construction are in particular used in separating columns in which liquid/gas mixtures are separated or in absorption columns in which a contact takes place between a liquid phase and a gas, whereby a material exchange can take place.

Unlike the vortex generating apparatus part in accordance with EP-A-0 048 508, the guide surfaces are short; in the plan view in the axis direction, the guide surfaces do not overlap.

It was previously assumed that an effective separating flow was not possible with short guide surfaces. Contrary to this assumption, it has been found that short guide surfaces also bring about the required effect if a local reduction of the gas speed occurs in the flow path downstream of the vortex generating apparatus, said local reduction arising due to an enlarging of the gas cross-section flowed through with respect to the inlet cross-section. One of the relatively simple constructions of the separating element in accordance with the invention can therefore be used successfully.

These and other objects and advantages of the invention will become more apparent from the following detailed description taken in conjunction with the accompanying drawings wherein:

FIG. 4 illustrates a droplet separator in accordance with a further embodiment;

FIG. 5 illustrates a flow guidance structure with guide surfaces and a conical deflection body which forms a vortex generating apparatus in accordance with the invention;

Figure 11:
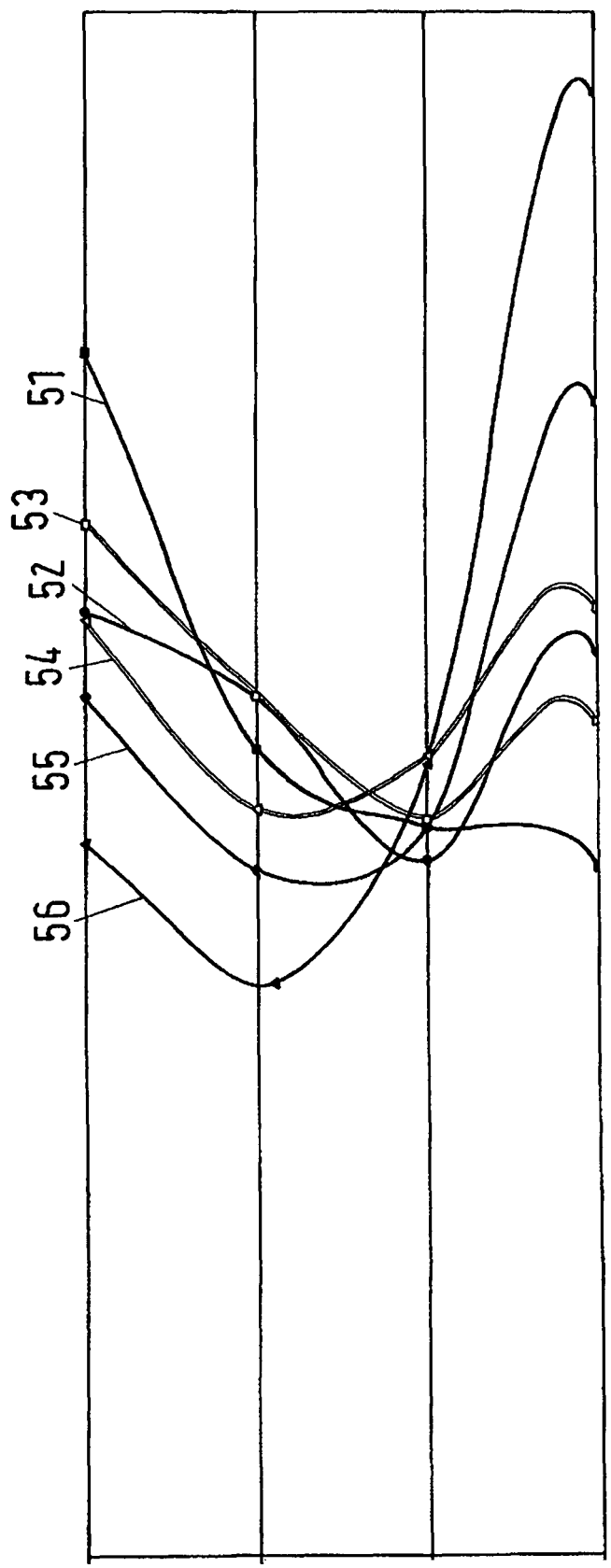
Figure 12:
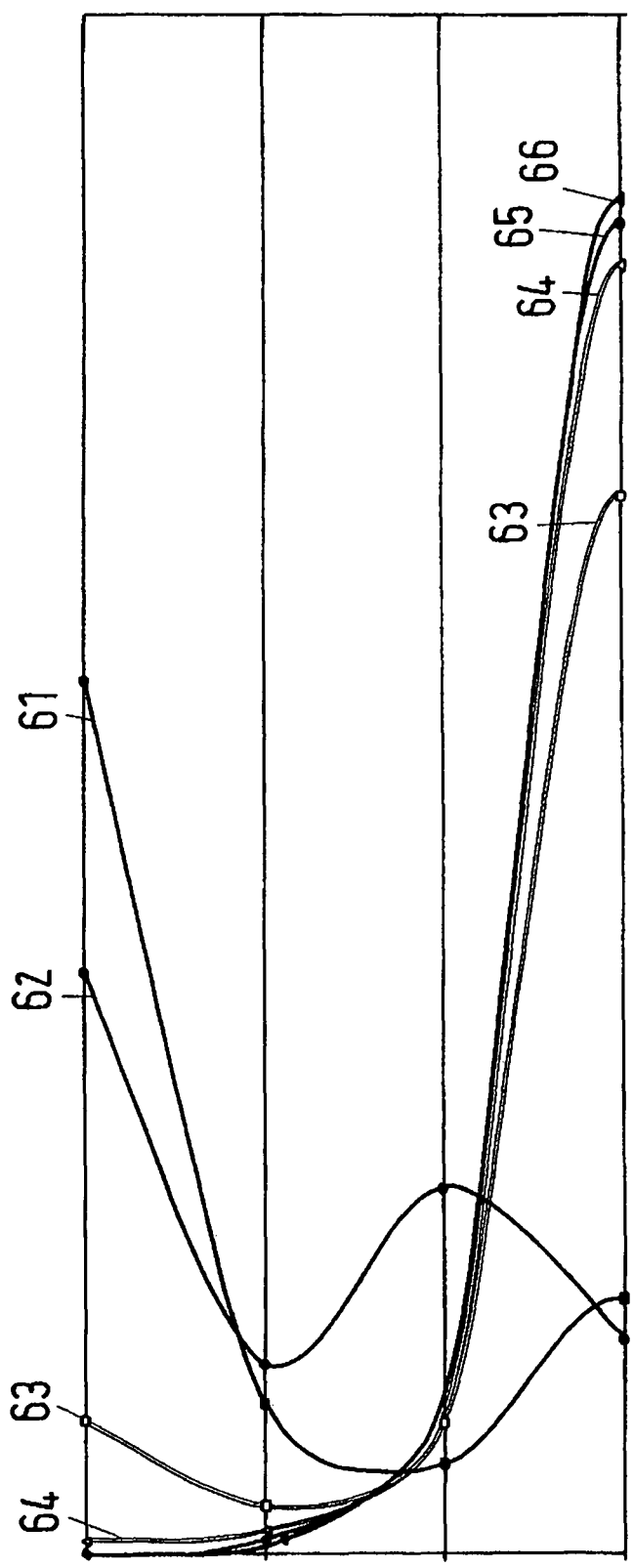
Figure 13:
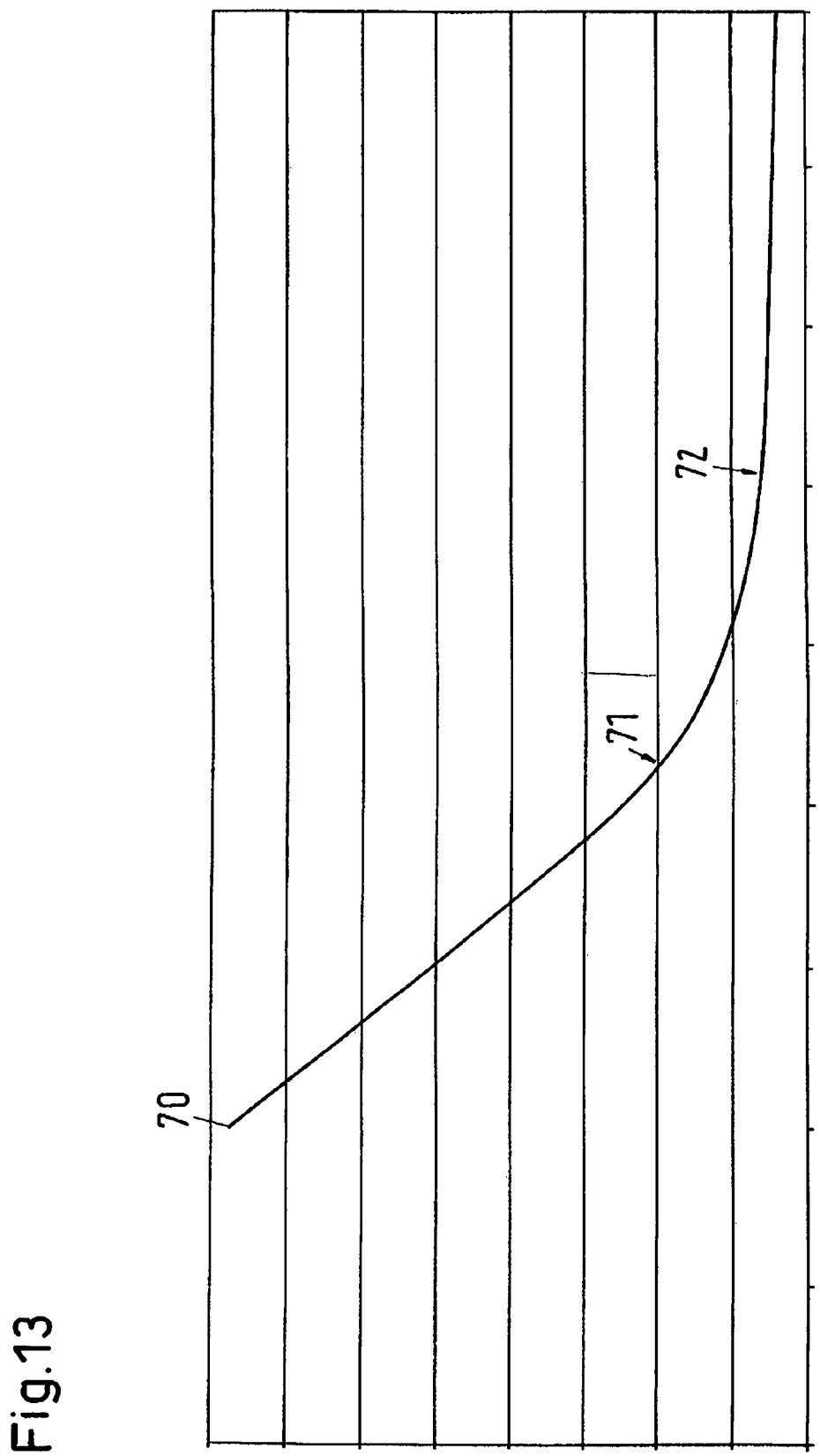

FIG. 11 graphically illustrates a representation of the relationship of the gas speed/mean gas speed in dependence on the height of the droplet separator;

FIG. 12 graphically illustrates a representation of the relationship of the liquid charge/mean liquid charge in dependence on the height of the droplet separator; and FIG. 13 graphically illustrates a representation of the pressure loss resistance coefficient in dependence on the setting angle of the guide surfaces.

Figure 1:
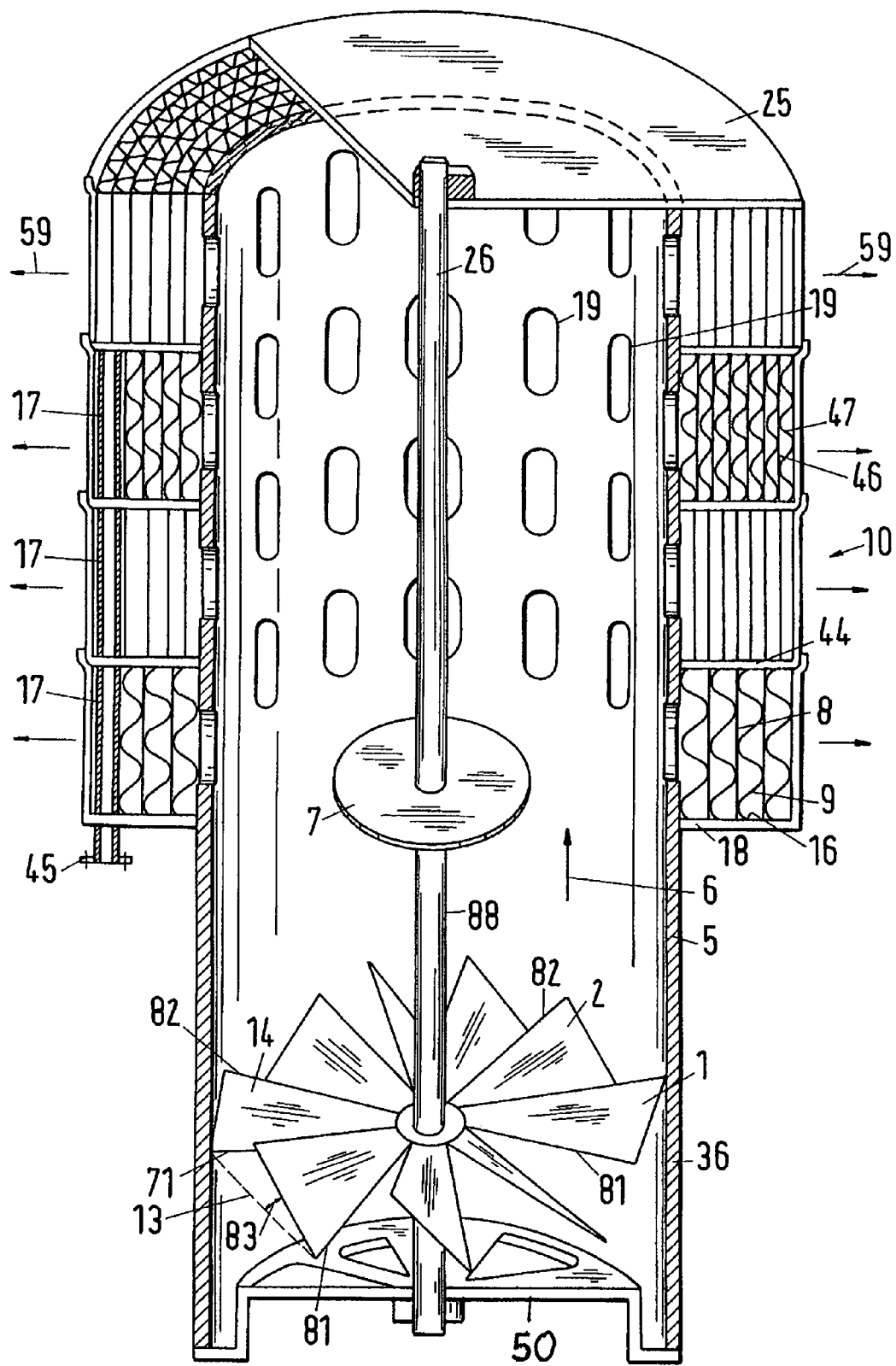
FIG. 1 illustrates a droplet separator with a vortex generating apparatus in accordance with the invention.

Referring to FIG. 1, the droplet separator 10 includes a jacket 12 that defines a central flow passage 5 for a flow of a droplet-carrying gas that enters via an apertured plate 50 secured across the bottom of the jacket 12 and flows in a main flow direction 6. As will be shown in the following, the flow direction of the gas molecules and of the carried-along liquid can differ substantially from the main flow direction 6 set forth. The indication of the main flow direction serves as a reference indication for the explanation of different special features of the gas flow to be encountered in the droplet separator. The term "gas flow" is also intended to cover the flow of liquid droplets carried along with the gas which actually cannot be separated from the gas at high gas speeds by the effect of gravity since the effect of gravity on the droplets is not sufficient with respect to the forces which act on the liquid droplets by the gas movement in the main flow direction to enable a falling movement of a droplet against the main flow direction 6, whereby a separation of the droplet would take place.

The flow passage 5 is flowed through by the droplet-carrying gas, with a vortex generating apparatus 1 being provided by means of which the droplet-carrying gas is directed in the direction of a separator element 8. A change of direction is forced onto the flow by means of the vortex generating apparatus, whereby the speed of the gas particles and liquid particles is given a radial component. The gas flow is deflected in the direction of the inner jacket surface by this radial component.

The gas flow 59 is then discharged from the separator element 8 in substantially the radial direction. Some of the liquid droplets can already be incident on the inner jacket surface and be separated by the additional radial component of the force acting on the droplet. Openings 19 are provided at the inner jacket surface through which the liquid-carrying gas flow can be discharged from the flow passage 5.

The separator element 8 is arranged in substantially ring-shape around the flow passage 5, with its inner jacket surface, which has substantially the diameter of the flow passage 5, including the openings 19 for the entry of the droplet-carrying gas into the separator element 8. The separator element 8 extends at least over a part of the length of the flow passage 5. In FIG. 1, for example, four separator elements 8 are arranged over one another.

Each separator element 8 includes a plurality of grid-like structures 9. These grid-like structures 9 can be formed, for example, by a wire net. Alternatively to this, a knitted fabric or a woven fabric can be used. Alternatively to this, the grid-like structure 9 is made up of elements arranged randomly with respect to one another, such as are present, for example, in a felt-like structure. Such a gas-permeable structure can be combined with structures of cylindrical grid elements 46 so that, on the one hand, a spacing is obtained between adjacent cylindrical structures 46 and, on the other hand, a coalescence of droplets can take place between the cylindrical structures which are then incident on the cylindrical structures and are there directed along just those cylindrical structures in the direction of a collection space 16.

When the gas flow flows through the grid-like structure 9, the liquid droplets are deposited on the surface of the grid-like structure 9 and coalesce to form liquid droplets of sufficient size which trickle along the grid-like structure 9 in the direction of the base of the separator element 8 formed as a collection space 16.

A number of embodiments have proven themselves for the arrangement of grid-like structures 9 in the separator element 8. In FIG. 1, for example, cylindrical structures 46 and wavy structures 47 are shown in alternating form. In the separator element drawn at the very bottom, the cylindrical structures are arranged in the direction of the main flow 6, that is, drawn in the vertical direction in FIG. 1. A respective wavy structure 47 is arranged between two cylindrical structures 46, that is, structures configured as cylindrical elements. The structure called a wavy structure in the following is intended to mean a cylindrical element whose surface is not planar in the development, but is provided with bulges or indentations in wave shape, zig-zag shape or other shapes. In the cross-section of the separator element arranged at the very bottom in FIG. 1, the wavy structure 47 can be seen in section, that is adjacent wave peaks of the same wavy structure substantially come to lie under one another. The waves of the wavy structure then extend at an angle to the horizontal direction, in particular in the main flow direction, that is in the vertical direction in FIG. 1. A horizontal arrangement of the waves, in contrast, has proven to be disadvantageous since liquid at the contact line between the wavy structure 47 and the cylindrical structure 46 cannot drain off in this case. This damming liquid is, however, then carried along with the gas flow so that, in this case, less liquid is separated because already separated liquid is taken along with the gas flow.

It is advantageous for this reason for the wavy structures 47 to be arranged such that an incline can form so that the liquid coalescing at the grid-like structures can flow off. In the separator element shown thereabove, a grid-like structure is shown with alternatingly cylindrical structures 46 and alternatingly wavy structures 47 in which adjacent wave peaks come to lie substantially next to one another. The contact lines between the wave-like structure 47 and the cylindrical structure 46 hereby lie substantially in the vertical direction. Alternatively to these two shown alignments of the wavy structures, a sectional angular orientation of the wavy structures is possible as long as it is ensured that the coalescent liquid can flow off. In addition, it is achieved by the alternating use of wavy and cylindrical structures that the cylindrical structures are arranged at a spacing from one another. Regions which are free of any structures are thus generated in the separator element. If the free volume portion is reduced in size, less gas can flow through with the same liquid portion in the gas; however, simultaneously, more of the small droplets can be separated.

The main advantage of the use of cylindrical structures 46 lies in the fact that the liquid does not only coalesce at the grid elements, but can also flow off in the direction of the collection space. A further advantage of the cylindrical grid elements is their relatively uncomplicated production as well as their stability. The wavy structures 47 take over the function of a spacer to the cylindrical structures. A further advantage is the increased shape stability of the separator element due to the reinforcement function of the cylindrical structures so that a plurality of separator elements of the same or different construction, such as shown in FIG. 1, can be stacked over one another in modular form. The height of the stack of separator elements is dependent on how much gas is directed through the droplet separator 10, but also on how the size distribution of the droplets in the gas is formed at the inlet into the droplet separator. With a very wide distribution with droplet sizes differing greatly from one another, a larger constructional height or a stack of a plurality of separator elements 8 arranged over one another will be necessary. In this case, the large droplets are substantially carried out by the separator element 8 which is arranged in very close proximity to the vortex generating apparatus 1, whereas the small, light droplets cover a further path together with the gas flow so that they are only discharged in further removed separator elements 8. For this purpose, separator elements 8 can also be combined with grid-like structures 9 of different types.

The grid-like structures differ, for example, in the size of the passage openings so that, analogously to a screen structure or a filter structure, structures of different permeability can be combined in a droplet separator. For this purpose, fabrics of different fineness can be used, for example. Despite these measures, it cannot be prevented with a droplet separator of this type that a gas which flows through the flow passage 5 substantially in the main flow direction 6, is mainly discharged by the separator elements 8 arranged at the very top. This will be looked at in even more detail in the following in the discussion of FIG. 11 and FIG. 12. A vortex generating apparatus 1 is therefore provided upstream of the separator element(s). A flow profile over the total height of a stack of separator elements 8 is generated by means of the vortex generating apparatus, said flow profile differing considerably from a flow profile without such a vortex generating apparatus 1 because a larger portion of the gas flow is carried into the separator element or elements adjacent to the gas inlet cross-section, that is arranged at the very bottom in the drawings, due to the rotary movement applied, as will be shown in the following in FIG. 11 or FIG. 12. In this context, the term at the very bottom, which is used for the description of the arrangements in accordance with the Figs., is intended to be used for the description of the spatial position of the separator elements in the drawings. However, this term is not to be understood such that arrangements in which the central axis does not substantially have a vertical direction, should be precluded in any way. In particular, a gas flow is introduced into these separator element(s) arranged at the very bottom, which increasedly includes the large droplets of the droplet spectrum, whereas the small droplets of the droplet spectrum are increasedly discharged in the separator element furthest away from the vortex generating apparatus part or in the part of the separator element furthest away—if only one single separator element is provided.

The vortex generating apparatus 1 is arranged in the interior of the flow passage 5 and includes a plurality of stationary guide surfaces 2, whereby at least some of the gas can be deflected from the main flow direction 6 in the direction of the openings 19. The guide surfaces 2 of the vortex generating apparatus 1 are arranged within a tube piece 36 upstream of the inner jacket surface 12 around a central axis 26 oriented in the main flow direction 6.

The guide surfaces 2 form an inlet opening 13 with a ring-shaped outlet opening 14 being provided parallel to the inlet opening 13 and downstream for the gas flow deflected by the guide surfaces 2. In accordance with the embodiment shown in FIG. 1, the guide surfaces 2 are fastened directly to a bar 88 which is arranged along the central axis 26. The inlet opening 13 is spanned by the edges 71 of the guide surfaces 2. The inlet opening 13 can be a cone surface, with the tip of the cone coming to lie in the central axis 26. The outlet opening 14 is formed by the edges 82 of the guide surfaces 2.

The guide surfaces 2 include an angle of inclination 83 with a plane which is aligned normally to the main flow direction 6, said angle of inclination being larger than 20° and smaller than 70°, preferably between 45° and 65°. The angle of inclination can vary along the edge 81 from the tube piece 36 up to the central axis 26 when the guide surfaces 2 have a curvature. A curvature of this type can be advantageous if the flow deflection should be of different strengths at different locations in the inner space of the tube piece 36. The angle of inclination 83 can, for example, be smaller in a region of the tube piece close to the central axis, that is, the guide surfaces 2 can be arranged flatter than in a region of the tube piece 36 close to the wall.

As illustrated, the vortex generating apparatus 1 is positioned in the flow passage 5 by a bar 88. This bar 88 is fixed at the upper end in a cover member 25 positioned on the separator element 8 and is fixed at the lower end in a support element 50 secured to the bottom of the tube piece 36, so that the bar 88 can be held in a central position within the flow passage 5.

In addition to the vortex generating apparatus 1 further deflection elements 7 can be provided in the flow passage 5. In particular, disk-shaped deflection elements 7 can be arranged around the central axis 26 of the droplet separator 10. A disk-shaped deflection element of this type serves for the improvement of the flow guidance and allows further improvements to be achieved with respect to the degree of utilisation of the surface of the separator elements 8. If a plurality of disk-shaped deflection elements 7 of this type are arranged above one another, they can be configured differently in their diameters as well as in their designs. The representation of a disk-shaped deflection element 7 is in no way to be considered as a restriction; depending on the diameter of the flow passage 5 and on the gas speed, it can be advantageous to provide guide elements as deflection elements which can, for example, be configured in a similar manner to the guide surfaces 2 or can have a screw-like, spiral or other flow-dividing shape and/or a shape deflecting the flow.

Figure 2:
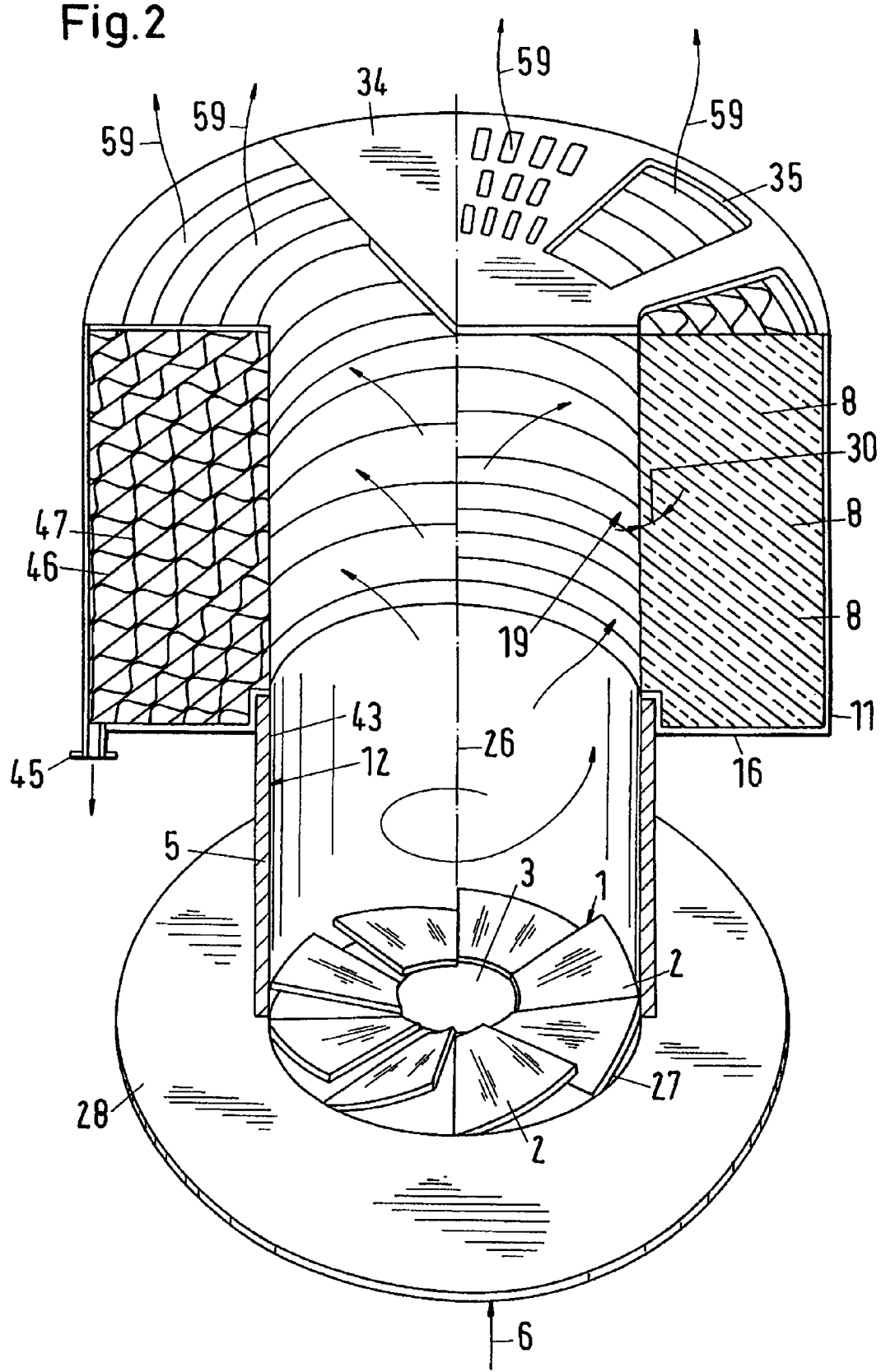
FIG. 2 illustrates a droplet separator with a vortex generating apparatus in accordance with a second embodiment.

A droplet separator in accordance with a second embodiment is shown in FIG. 2. Unlike the embodiment shown in FIG. 1, a bar 88 extending along the central axis 26 is not necessary in accordance with this embodiment. The flow passage 5 in this representation is shown without installations in the region of the separator elements 8. The main flow direction 6 of the liquid-carrying gas which should enter into the droplet separator 10 lies in the arrow direction shown.

The droplet separator 10 includes a tube piece, in particular a cylindrically configured tube piece, with an inner jacket surface 12. The tube piece is arranged upstream of the separator elements 8. A vortex generating apparatus 1, which is shown more precisely in FIG. 5, is arranged at the lower end of this tube piece shown in FIG. 1.

The vortex generating apparatus 1 includes an outer ring 27 which has an inner diameter 21. The outer ring 27 is a component of the column base 28. The vortex generating apparatus 1 in accordance with a preferred embodiment is stamped out of the column base or is cut out of the column base 28 by means of a cutting process, in particular, a laser cutting process. A more detailed description of a preferred process for the manufacture of a vortex generating apparatus 1 takes place in the description of FIGS. 6 to 8.

The tube piece with the inner jacket surface 12 is pulled over the column base 28 with the integrated vortex generating apparatus 1 so that the vortex generating apparatus 1 is disposed precisely at the inlet into this tube piece. The guide surfaces 2 folded out of the column base 28 can be used as positioning aids by means of which a centration and positioning of the tube piece 36 can be carried out. Instead of the connection shown to the column base 28 with the flow channel 5, a flange connection of the two named components can also be provided, in particular when a column of small diameter is used and the droplet separator is arranged at the head of the column. The outer ring 27 comes to lie between the two flange parts in this case. Such a flange connection of two elements (5, 28) forming a flow passage is known to the skilled person and is therefore not shown in the drawings.

The outer ring 27 surrounds a plurality of guide surfaces 2 which at least partly include an angle with respect to the main flow direction 6. The droplet-carrying gas is incident in the main flow direction 6 onto the guide surfaces 2, is directed in a compulsory manner along the surface of the guide surfaces so that a radial and tangential velocity component is imposed on the flow. The guide surfaces 2 are connected to one another via a rotationally symmetrical deflection body 3 which is preferably arranged centrally.

Referring to FIG. 2, the deflection body 3 is made as a circular disk. The disk has an outer diameter 22 which simultaneously represents the inner boundary line of the guide surfaces 2.

In the simplest case, the guide surfaces 2 are planar and consist of sector elements having an outer radius which corresponds to the radius of the inner diameter 21 of the ring 27 and having an inner radius which corresponds to the radius of the outer diameter 22 of the disk. If the sector elements are separated along their sector edges as well as along a part of the edge of the outer diameter 22 belonging to the sector as well as of the inner diameter 21 and are tilted out of the planar surface, a vortex generating apparatus 1 of the most simple construction results.

Referring to FIG. 5, an example of an improved vortex generating apparatus is shown whose guide surfaces lie on a conical deflection body 3 and thus a higher shape stability can be achieved. The guide surfaces 2 can in particular be manufactured from the disk-shaped raw part by means of a cutting process or a stamping process. Subsequently to the separation of the material to obtain the sector elements, the latter are directed out of the disk surface so that a passage opening for the gas results.

The gas flow deflected by the vortex generating apparatus moves in the direction of the inner jacket surface 12 which is formed in this case by inlet openings into at least one separator element 8 of a second constructional type. In the present case, a stack of three separator elements 8 arranged over one another is shown as an example. The inner jacket surface 12 is formed by the inner periphery of the separator elements so that the inner jacket surface 12 with the openings 19 required in FIG. 1 can be eliminated.

Figure 3:
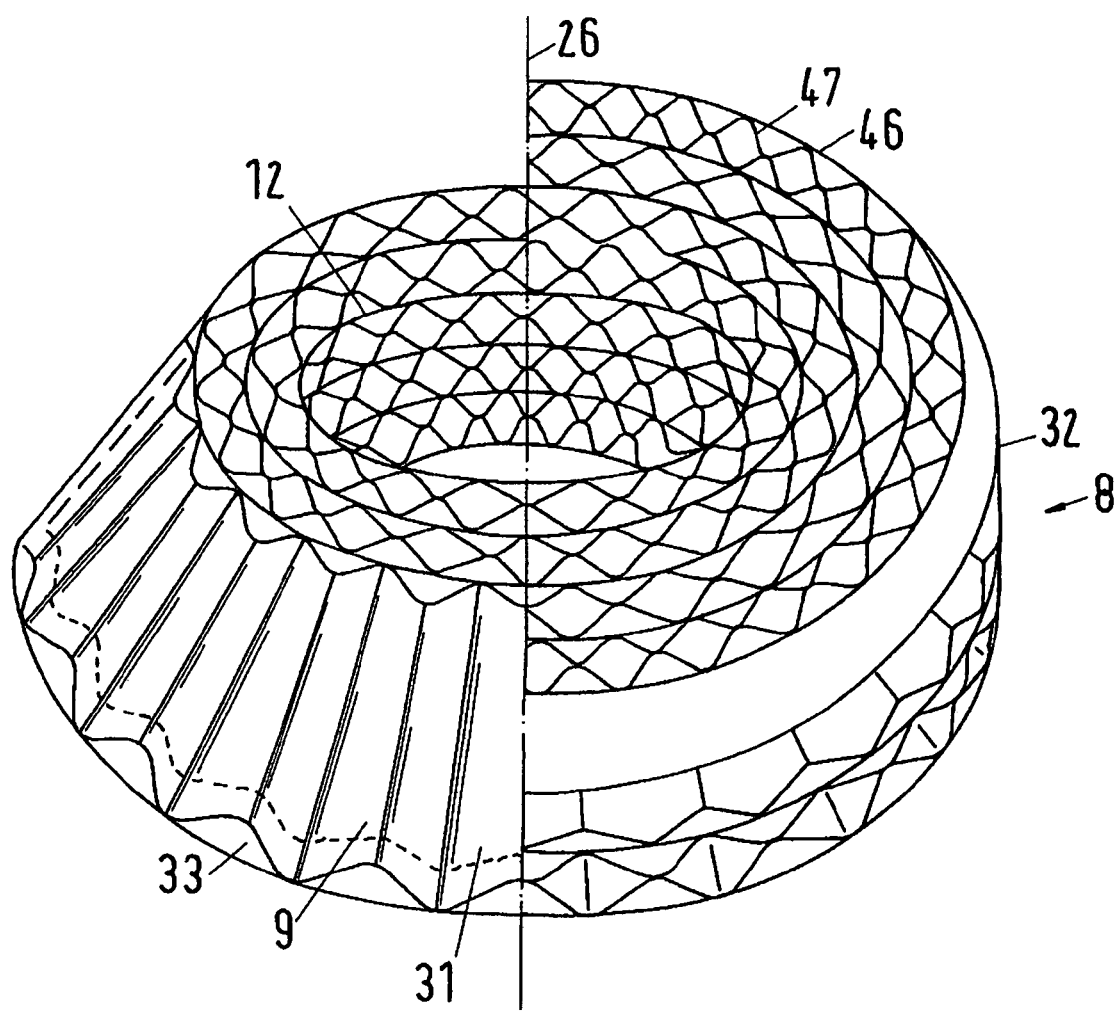
FIG. 3 illustrates a detail of a separator element in accordance with one of the embodiments shown in FIG. 2.

The separator element 8 for a droplet separator 10 in accordance with FIG. 3 includes a plurality of conically arranged layers 31 of gas-permeable structures 9 which can in particular be made as grid-like structures. The tip of such a cone would lie on the central axis 26 with a circular cylindrical cross-section. The grid-like structures between the inner jacket surface 12 or its imagined continuation and a wall 11 are arranged at an angle 30 to the inner jacket surface 12 and/or wall 11, with the angle 30 preferably lying between 30° and 70°, in particular between 45° and 60°. The angle 30 can be seen in the sectional representation of FIG. 2.

The layers 32 have a simple conical surface and the layers 31 have a conical surface with superimposed wavy structures or comparable structures forming a passage. Layers 32 and layers 31 can be arranged in an alternating order; alternatively to this, as shown in FIG. 3, a layer 32 is followed by two layers 31 which have an arrangement of the wavy structures in the opposite sense. In this context, a part of the layers is not shown in the left hand part of FIG. 3 so that the course of a layer 31 can be seen better. The layer 31 thus includes a wavy structure which can be obtained, for example, by folding a layer 32 of enlarged surface. The wave shape shown is only one possible embodiment for a layer 31 of this type; any surface-enlarging structure can be suitable to hold two adjacent layers 32 at a specific spacing as long as an intermediate space 33 is formed between the layers through which the droplet-carrying gas can flow. By this measure, the gas flow is divided by the grid-like structures of a layer, is combined again in the intermediate space 33 in order then to be divided again by the following layer.

Due to the flow dividing function of the grid-like structures and to the flow collector function of the intermediate spaces 33, droplets are directed to the grid-like structure where they adhere and trickle along the grid-like structure into a collection space 16.

In accordance with the representation in FIG. 2, three separator elements 8 of the type of FIG. 3 are stacked over one another. Gas can both enter into the separator elements via the surface corresponding to the inner jacket surface 12 and can also run through more than one separator element sequentially. In FIG. 2, the wall 11 which surrounds the separator elements accordingly has correspondingly fewer outlet openings for the gas, or alternatively to this, the outlet openings can be completely dispensed with. The gas is discharged through the top region 34 of the separator element 8 arranged at the very top and provided with openings 35. The gas flow 59 in this embodiment thus takes place substantially parallel to the central axis 26. Different arrangements and sizes are shown in FIG. 2 for the openings 35. The central region of the top region 34 disposed over the flow passage does not include any openings so that the total gas flow is directed over the separator elements 8.

Instead of the stack shape of separator elements 8 drawn in FIG. 2, analogue to the representation in FIG. 1, the layers of grid-like structures belonging to a separator element can be held by a plate 44 substantially arranged perpendicular to the main flow direction. Adjacent separator elements can be separated by plates 44 of this type. Liquid can be drawn off separately from each separator element by such plates to avoid having the liquid already separated from again being carried along by the gas flow. Each of the plates can be made as a collection space 16. Collection spaces 16 of plates 44 disposed above one another can be connected to one another by drain pipes 17. Each drain pipe 17 has a lower end which can be configured as a discharge stub 45 through which the liquid exits the collection space 16 or the droplet separator.

Referring to FIG. 4, the vortex generating apparatus 1 can be composed of separator elements 8 made in modular form. The gas flow is directed by the upstream first separator element 8 via the vortex generating apparatus 1 and enters via slot-like openings 15 into the separator element or elements 8. A separation takes place there, with a delay of the flow taking place downstream after the openings 15. Adjacent separator elements 8 are each separated from one another by plates 44 with the bottommost of the plates corresponding to the base plate 18 of FIG. 1. The outer boundary of a separator element is not formed by a wall 11, as in FIG. 2, but by a cylindrical structure 46, as was already described in connection with FIG. 1.

The separator element contains grid-like structures which—as described above—can include cylindrical structures 46 as well as wavy structures 47. In FIG. 4, a further embodiment for a wavy structure 47 is shown. The waves of this wavy structure have an S-shaped curvature. In the proximity of the upper and lower ends of the separator element, the waves extend substantially in the main flow direction 6, whereas they are inclined at an angle to the main flow direction in the central region of the separator element. Adjacent grid-like structures can have different angles of inclination, in particular the wavy structures can form a cross-channel like structure. Adjacent cross-channel like structures can be separated from one another by a cylindrical structure 46; alternatively to this, it is also possible to have S-shaped structures of this type follow one another directly. Liquid droplets are caught at these grid-like structures, coalesce and run off in the direction of the plate 44 made as a collection space 16 or the base plate 18 connected to the cylindrical or wavy structures (46, 47).

The inner boundary of the separator element, that is the boundary of the separator element surrounding the flow passage 5, is formed by the inner jacket surface 12. The inner jacket surface 12 includes the openings 15 already described above. It is shown in this embodiment that each separator element has its own inner jacket surface 12. This means that the separator element also includes the inner jacket surface 12 in addition to the grid-like structures (46, 47) as well as a plate or base plate (18, 44).

In this embodiment, each separator element is thus a separate module which can be combined to form a stack of separator elements. An inner jacket surface 12 having the vortex generating apparatus 1 is arranged upstream of the separator element 8 shown at the very bottom in FIG. 4.

The inner jacket surface 12 has a horizontal inlet opening 13. Guide surfaces 2 follow downstream after the inlet opening 13, i.e. above this inlet opening 13 in the representations of FIG. 1 to FIG. 4. A rotational flow is induced in the gas flow which flows through the inner jacket surface 12 around a central axis which is arranged in the direction of the main flow direction 6 so that droplets are separated along the inner jacket surface 12 in the form of a flowing liquid film. Openings such as slots 15, for example, through which the separated liquid flows into a collection space 16 between the wall 11 and the inner jacket surface 12, are provided in the inner jacket surface 12. The liquid is transported on from the collection space 16 through a drain pipe 17 into a liquid collector, not shown, of the droplet separator.

A variation of the droplet spectrum and/or a pre-separation can take place upstream of the vortex generating apparatus by means of a coalescent agent which is made, for example, as a mat 86. Liquid can be caught in such a mat 86—shown by way of example in FIG. 10—in that the droplets can be separated onto wettable surfaces which are formed, for example, as a network of fine wires or fibers. Such a mat 86 is arranged, for example, beneath the column base 28 or in the tube section including the vortex generating apparatus. Detaching droplets are again carried along with the gas flow, with the mean droplet diameter being increased by the combined effect of coalescence and adhesion with respect to the mean droplet diameter upstream of the mat.

The following effect can be observed in the mat 86. Separation of small droplets which are incident onto the wettable surface of the mat and are held on the same by cohesive forces, takes place at the grid-like structures from which such a mat is substantially made. Due to the continuous separation of small droplets, these droplets combine on the grid-like structure of the mat to form larger droplets. Such droplets are, in turn, captured and carried along by the gas flow when they detach from the surface of the grid-like structure. Since the droplet diameter is still too small to be separated by gravity against the main flow direction 6 at the gas speed present in the region of the vortex generating apparatus, they are transported by the gas flow in the direction of the separator element 8.

Figure 8:
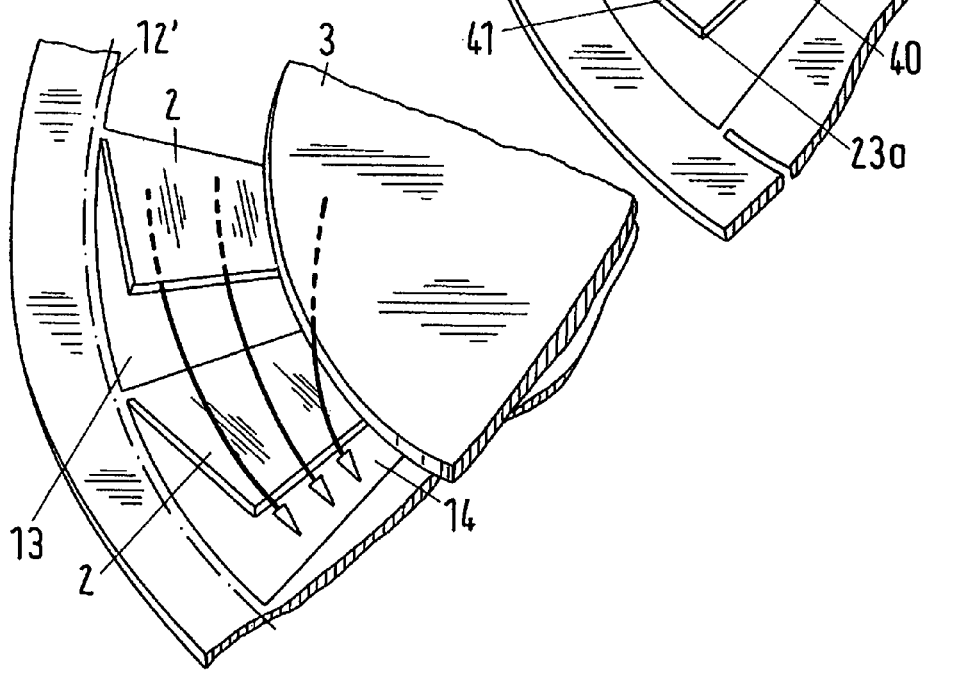
FIG. 8 illustrates the same sheet metal piece of FIG. 6 with the conical deflection body and an indication of the gas flow by arrows.

FIG. 5 shows a flow guidance structure of the vortex generating apparatus 1 with the guide surfaces 2 and a deflection body 3. A ring-shaped outlet opening 14 for the gas flow deflected by the guide surfaces 2 is left free downstream of the inlet opening 13 and parallel to it. This outlet opening 14 lies between the deflection body 3 arranged on the central axis and the inner wall 43 of the tube piece 36 or of the inner jacket surface 12, with the inner wall 43 also being intended to be covered by the term inner jacket surface in the following. That is to say, the inlet opening 13 is in the plane of the ring 27 whereas the outlet opening 14 is between the radial edge 40 of one guide surface 2 and the edge of the adjacent guide surface 2 which lies in the plane of the ring 27. FIG. 8 shows the flow through one of the inlet openings 13 towards the outlet opening 14 and further upwards. The flow through the other openings 13,14 has the same characteristics.

The deflection body 3 is conical and has a cone angle which matches the upper edges 40 of the guide surfaces 2. The deflection body 3 contacts the upper edges 40 along contact lines 89 in the central region surrounded by the outlet opening 14.

Due to a combined effect by the deflection body 3 and the guide surfaces 2, a rotational flow is induced around the central axis 26.

Figure 6:
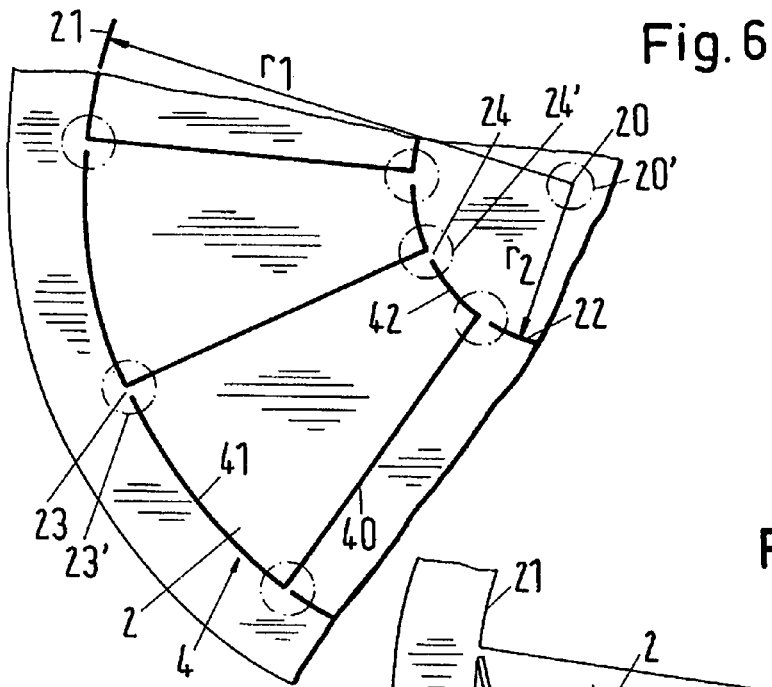
FIG. 6 illustrates a pre-worked sheet metal piece with guide surfaces disposed in a plane, said sheet metal piece being shapable by a further workstep into a flow guidance structure for the apparatus part in accordance with the invention.

The flow guidance structure will be explained in more detail with respect to the FIGS. 6 to 8. FIG. 6 shows a preworked sheet metal piece with guide surfaces 2 disposed in a plane, said sheet metal piece being able to be shaped by a further workstep into the flow guidance structure for the apparatus 1 in accordance with the invention. The guide surfaces 2 are bent for this purpose in each case out of the plane of the sheet metal piece around two torsion points 23 or 24 (i.e. centers of the circles 23', 24' drawn with a chain-dotted line). The guide surfaces 2 between the inner diameter 21 of the ring 27 and the outer diameter 22 of the disk form a ring around the center 20 (i.e. center of the circle 20') of the sheet metal piece which comes to lie in the droplet separator on the central axis of the tube piece 36 or of the inner jacket surface 12. The outer torsion points 23 are arranged—forming a first regular polygon—on the inner diameter 21 of the ring 27. The inner torsion points 24—i.e. the second half of the torsion points—form a second regular polygon on the outer diameter 22 of the disk. A regular polygon is understood in this context as a polygon whose edge lengths are equal. The two polygons are regular dodecagons in the embodiment shown. Twelve guide surfaces 2 are thus present. In the embodiment of FIG. 2, the polygons are octagons and there are eight guide surfaces 2. Polygons are naturally also possible whose number of corners is 6, 10 or another natural number lying, for example, between 3 and 12, with an optimum number lying in a midrange of this interval.

The guide surfaces 2 are produced from the planar sheet metal piece by means of slot-shaped openings 4 by which edges of the guide surfaces 2 are formed, namely radial edges 40 as well as peripheral edges 41 or 42 on the diameters 21 and 22. The two named polygons do not necessarily have to be arranged with respect to one another such that the edges 40 are radial: the edge 40 can include an angle which is smaller than 180° with the radius $r_2$ of the inner circle 22 which connects the center 20 to the torsion point 24 of the edge 40.

The torsion points 23, 24 each have a surrounding space surrounding space separates the gap-shaped openings 4 of adjacent guide surfaces 2. That is, these surrounding spaces form radial material bridges on the diameters 21 and 22 between adjacent edges 41 or 42. The gap-shaped openings 4 can be made, for example, by means of a laser cutting process, by stamping or by wire erosion, with a plurality of metal sheets arranged in a stack being able to be worked simultaneously in the case of wire erosion.

The radius $r_2$ of the outer diameter of the disk 22 can—differently from that shown in FIG. 6—be selected to be substantially smaller than the radius $r_1$ of the inner diameter of the ring 27 so that the areas of the two diameters differ by at least a hundred fold. This is advantageous with respect to a treatment capacity of the droplet separator since largely the whole available cross-section surface of the inner jacket surface 12 can be used with the inlet opening 13 for the treatment of the gas flow. For strength reasons, the embodiment shown in FIG. 6 can be more advantageous wherein the ratio of $r_1:r_2$ lies preferably in the range of 2 to 4.

Figure 7:
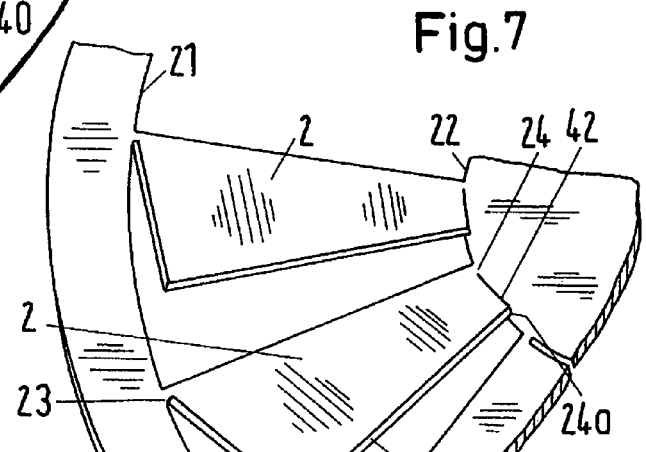
FIG. 7 illustrates the partly shaped sheet metal piece of FIG. 6.

FIG. 7 shows the sheet metal piece of FIG. 6 in which two adjacent guide surfaces 2 are bent from the plane of the sheet metal piece around the torsion points 23 and 24. The peripheral edges 41 and 42 are drawn as straight connections of the corner points 23, 23a, or 24, 24a, for reasons of simplicity. All the guide surfaces 2 include an angle of inclination with the inlet surface 13 after the shaping which is larger than 25° and smaller than 65°. The angle of inclination is selected such that a guidance structure arises which is ideal with respect to a swirl generation in the gas flow and a pressure droplet between the inlet opening 13 and the outlet opening 14. It can be advantageous with respect to such an optimisation for the guide surfaces 2 to be curved. For the same purpose, the guide surface 2 can also be configured such that it has at least two planar part surfaces which are inclined with respect to one another. A bending around edges can be facilitated by additional gap-shaped openings which are partially established on the bending edges.

FIG. 8 shows the shaped sheet metal piece of FIG. 7 with the conical deflection body 3. The gas flow which flows through the guidance structure between the inlet opening 13 and the outlet opening 14 is indicated by arrows 5. The line 12' drawn as a chain-dotted line indicates the outer edge of the inner jacket surface 12 at its inlet end. The deflection body 3, which can be conical or of plate shape, determines the size of the outlet opening 14. This should be at least 20% smaller than the inlet opening 13, with it preferably being 30-40% smaller. It is advantageous for the diameter of the deflection body 3 to be approximately equally as large as the radius $r_1$ of the inner diameter 21 of the ring 27 or somewhat larger.

Figure 10:
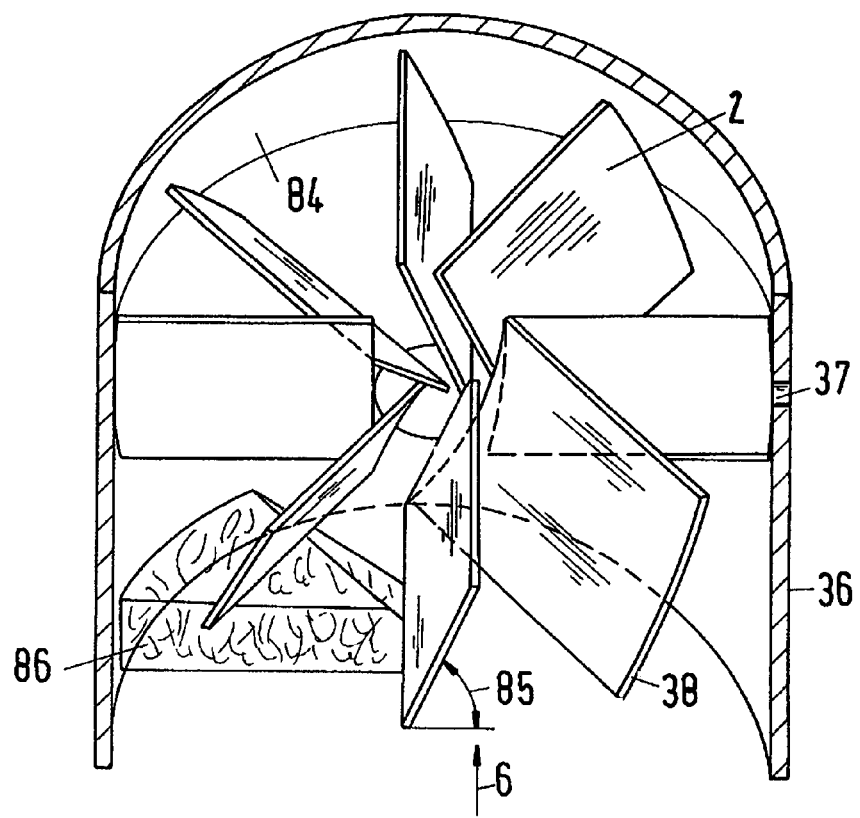
FIG. 10 illustrates the flow guidance structure of FIG. 9.

The droplet separator in accordance with the invention is advantageously used together with further apparatus. At least one mat 86 can thus be arranged upstream in the gas stream before the vortex generating apparatus 1 for the purpose of a droplet coalescence, with liquid in the form of fine droplets being able to be separated in the form of fine droplets on wettable surfaces in it. The liquid is again released into the gas flow and is taken along with it against the force of gravity in droplets with a larger mean droplet cross-section due to shear forces which generate the gas flow in the mat 86. (It is presupposed in this connection that the speed of the gas flow is sufficiently high.) The larger droplets can be separated in the droplet separator with a higher efficiency than the finer droplets. As already described above, the same or similar droplet separating mats 86 can be integrated for the gas flows which are discharged from the droplet separator or separators. A section of a mat 86 of this type is shown in FIG. 10.

Upstream of the described arrangement, which includes at least one droplet separator in accordance with the invention, the gas flow is distributed using a distributor largely uniformly over a cross-section surface—for example the cross-section surface of a column—covered by the droplet separator. A first part of the liquid taken along by the gas flow is advantageously already separated in such a distributor. An arrangement of this type is disclosed in EP-A-0 195 464.

The diameter of the inner diameter 21 of the ring 27 (=$2r_1$) has a value between 50 and 300 mm, preferably between 150 and 250 mm. The height of the inner jacket surface 12 is larger by a factor 2.7-3.7 (preferably 3.1-3.4) than $2r_1$.

Figure 9:
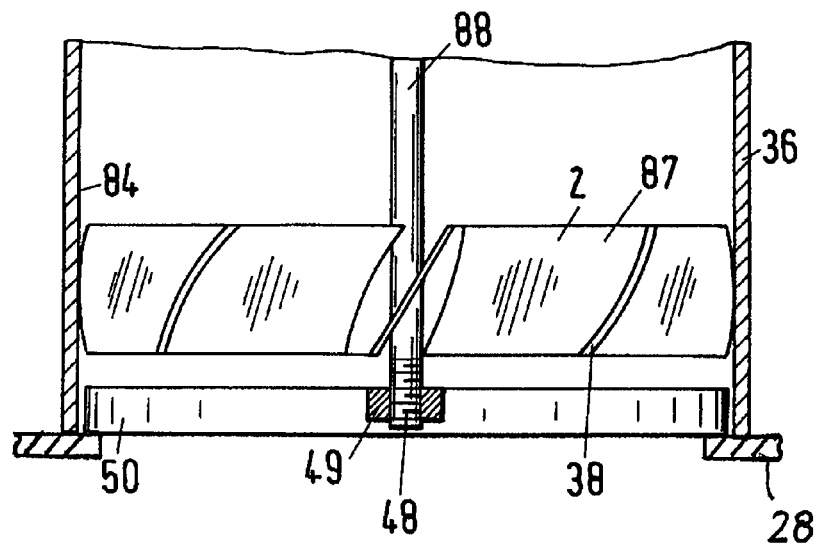
FIG. 9 illustrates a flow guidance structure in accordance with a further embodiment in a front elevation.

FIG. 9 shows a flow guidance structure in accordance with a further embodiment in a front elevation. The vortex generating apparatus 1 in accordance with FIG. 9 is arranged in a tube piece 36 which is arranged upstream of a droplet separator, not shown, in accordance with one of the preceding embodiments. In the representation, the front part of the tube piece 36 is not shown so that the guide surfaces 2 become visible. The guide surfaces therefore appear to hover freely in the air in this representation. The guide surfaces are, however, attached to the inner wall 84 of the tube piece 36, and indeed either non-releasably by a weld connection or releasably by a plug connection. For this purpose, a slot-like opening 37, for example, is provided in the wall of the tube piece 36 in which an end 38 of the guide surface 2 is received. Each guide surface is configured as a plate-shaped element 87 which is arranged at an angle to the main flow direction 6. The angle 85 between the guide surface and a plane disposed normally to the main flow direction 6 lies between 20° and 70°, in particular between 45° and 650, particularly preferably at 60°. At this angle 85, an ideal distribution of the flow over the inner jacket surface of all separator elements is possible, with the pressure loss being able to be kept low.

In FIG. 9, a bar 88 arranged along the central axis 26 is furthermore arranged by means of which, in accordance with FIG. 1 or 4, a cover element 25 is positioned on the separator element 8 of the droplet separator 10 arranged at the very top. The individual separator elements of a multi-stage droplet separator are hereby held together. Furthermore, guide surfaces of a vortex generating apparatus can be arranged on the bar 88 in accordance with FIG. 1, and/or further flow-conducting elements such as a deflection element 7, which is shown in FIG. 1 or FIG. 4, or further elements which conduct the flow and which include, for example, screw-shaped guide surfaces. For this purpose, the bar 88 in accordance with FIG. 9 is provided at its lower end 48 with a thread which is received in a nut 49 which is fixedly connected to a support element 50. The support element 50 is preferably made as a plate-shaped element which is arranged in the tube piece 36 and has openings that allow the flow to pass as freely as possible such that it itself has a flow resistance which is as low as possible. In this embodiment, the support element 50 lies on top of the column base or tray 28.

In FIG. 10, the flow guidance structure of FIG. 9 is shown in a different elevation. The bar 88 has been omitted in this example. In the present illustration, 8 guide surfaces are arranged at equal intervals from one another. If the flow to the guide surfaces is from the bottom in the direction of the main flow direction 6, a flow deflection takes place at the guide surfaces. The ends of the guide surfaces 38 are, as was described under FIG. 9, connected to the tube piece 36 by a releasable or non-releasable connection. A section from a slot-like opening 37 is shown on the right hand side of FIG. 10.

FIG. 11 shows a representation of the relationship of the gas speed/mean gas speed in dependence on the height of the droplet separator 10. The gas amount and liquid amount to the inlet surface of a separator element is controlled by the use of a vortex generating apparatus such that less liquid is carried to the upper region of the vertically installed separator element, whereas the gas amount over the inlet surface of the separator element is largely harmonised and smoothed.

In the separator element, the liquid is incident on grid-like structures in the form of droplets, whereby droplets are separated in accordance with their inertia. Due to adhesion, adjacent droplets form larger droplets which can in turn combine to form a liquid film or trickle. The separated liquid has to flow downwardly through the separator element in accordance with gravity, whereas the gas continues to flow in the preset direction through the separator element. The separated liquid causes a resistance (liquid hold-up) in the separator element, whereby the gas speed has to be reduced in order not to generate any droplet discharge from the liquid already separated.

The droplets receive a radially directed velocity component due to the centrifugal force so that they are carried outwardly in a similar manner as in a centrifuge in accordance with the direction of the velocity vector. The larger droplets will already coalesce as liquid briefly after the vortex generating apparatus at the outer boundary and less liquid is directed to the upper regions of the separator element 8 so that the liquid hold-up is lower in these separator elements. Some of these droplets are already separated after the vortex generating apparatus by the radial velocity vector and are discharged via the base plate formed as the collection space. The construction height of the separator element or of the stack of separator elements can consequently be reduced by the use of a vortex generating apparatus 1.

In this connection, the ratio of gas speed/mean gas speed is indicated on the x axis of the graph, with the gas speed being able to lie as a maximum approximately twice as high as the mean gas speed. The height of a stack of separator elements is entered on the y axis. If the tube piece 36 has a diameter of, for example, 200 mm, a height of the stack in a range of 0.4 to 1 m is ideal. The ratio of gas speed to mean gas speed for a droplet separator without a vortex generating apparatus in accordance with the curve 51 is determined for such a model system. This curve development makes clear that the lower regions of the droplet separator are only flowed through weakly and represent a solution in accordance with the prior art.

It is already possible by means of the deflection elements 7 shown in FIG. 1 to direct a higher portion of gas flow into the lower regions of the droplet separator. The effect of such deflection elements is shown in curve 52 so that a substantial portion of the liquid is separated in the lower regions of the droplet separator.

Curves 53, 54, 55, 56 relate to embodiments in which a vortex generating apparatus with guide surfaces in accordance with the embodiment shown in FIGS. 9 and 10 is installed upstream of the droplet separator. An angle of 60° to the main flow direction was selected for the guide surface for the determination of the curve 53; an angle of 50° was selected for the determination of the curve 54; an angle of 40° was selected for the determination of the curve 55; and an angle of 20° was selected for the determination of the curve 56.

FIG. 12 shows a representation of the relationship of the liquid charge/mean liquid charge in dependence on the height of the droplet separator 10. In this connection, the ratio of liquid charge/mean liquid charge is entered on the x axis of the graph, with the liquid charge being able to lie as a maximum approximately five times as high as the mean liquid charge. The height of the stack is entered on the y axis. If the tube piece 36 has a diameter of, for example, 200 mm, a height of the stack in a range of 0.4 to 1 m is ideal. The ratio of liquid charge to mean liquid charge for a droplet separator without a vortex generating apparatus in accordance with the curve 61 is determined for such a model system. This curve development makes clear that the lower regions of the droplet separator only have a small liquid charge and represent a solution in accordance with the prior art.

It is already possible by means of the deflection elements 7 shown in FIG. 1 to separate a higher portion of liquid charge in the lower and central regions of the droplet separator. This improvement can be seen from curve 62 in the comparison with curve 61. Despite all this, a large portion of the liquid charge still arises in the upper part of the stack.

Curves 63, 64, 65, 66 relate to embodiments in which a vortex generating apparatus with guide surfaces in accordance with the embodiment shown in FIGS. 9 and 10 is installed upstream of the droplet separator. An angle of 60° to the main flow direction was selected for the determination of the curve 63; an angle of 50° was selected for the determination of the curve 64; an angle of 40° was selected for the determination of the curve 65; and an angle of 20° was selected for the determination of the curve 66. The degree of utilisation of the droplet separator is thus further improved. It hereby becomes possible to reduce the total construction height of the droplet separator, which represents a substantial advantage in the event of a lack of space in separation columns.

FIG. 13 shows a representation of the pressure loss resistance coefficient in accordance with the embodiment in FIG. 9 and FIG. 10 in dependence on the setting angle of the guide surfaces of the vortex generating apparatus. The setting angle, which can theoretically lie between 0 and 90°, is entered on the x axis. In the range from 0° to 20°, the guide surfaces are so flat that the pressure loss resistance coefficient lies in every case above a technically sensible range. Only from an angle of approx. 20°, which corresponds to the left hand end 70 of the curve, does the pressure loss resistance coefficient lie in a range which permits a continuous operation of a droplet separator in a separator column. The pressure loss resistance coefficient falls in an approximately linear manner (71) up to approx. 40°; from approximately 60° (72) hardly any reduction in the pressure loss resistance coefficient occurs. The guide surfaces 2 include an angle of inclination with the inlet opening 13 which is larger than 20° and smaller than 70° and preferably lies between 45° and 65°. The optimum value for the angle of inclination is at 60°, as results in connection with the results of FIG. 12 (curve 63). With almost minimal pressure loss, the desired high degree of separation is already obtained in the region of the droplet separator which lies directly downstream of the vortex generating apparatus.

What is claimed is:

1. A droplet separator comprising
a jacket defining a central flow passage for a flow of a droplet-carrying gas in a main flow direction;
a vortex generation apparatus in said central flow passage for setting the droplet-carrying gas into a rotary movement whereby droplets in the droplet-carrying gas are directed by centrifugal force in a radial direction relative to said flow passage and at least some of the droplet-carrying gas is deflected from the main flow direction radially outwardly; and
at least one annular separator element downstream of said vortex generation apparatus for receiving the droplet-carrying gas therein, said separator element including a plurality of grid-like structures for separating droplets from the droplet-carrying gas passing there through.

2. A droplet separator in accordance with claim 1 wherein said grid-like structures of said separator element direct the droplet-carrying gas from said jacket in a flow direction which includes an angle of >0° and <180° relative to said main flow direction.

3. A droplet separator in accordance with claim 1 wherein each said grid-like structure is annular and is disposed concentrically to said jacket.

4. A droplet separator in accordance with claim 1 wherein each said grid-like structure is at an angle of from 45° to 60° relative to said jacket.

5. A droplet separator in accordance with claim 1 further comprising a plurality of separator elements and a plurality of base plates disposed in alternating manner with said separator elements, each said base plate being substantially perpendicular to said main flow direction and supporting said grid-like structures of a respective separator element thereon.

6. A droplet separator in accordance with claim 5 further comprising a plurality of collection means, each said collection means being disposed for collecting liquid separated in said grid-like structures on each respective base plate.

7. A droplet separator in accordance with claim 1 further comprising at least one mat for droplet coalescence disposed in the flow of droplet-carrying gas upstream of said vortex generating apparatus relative to said main flow direction.

8. A droplet separator in accordance with claim 1 wherein said vortex generating apparatus includes a plurality of stationary guide surfaces disposed radially of said main flow direction in circumferentially spaced apart relation to deflect the flow of droplet-carrying gas passing there between.

9. A droplet separator in accordance with claim 8 wherein each said guide surface is disposed on an angle of inclination of from 45° to 65° relative to a plane perpendicular to said main flow direction.

10. A droplet separator in accordance with claim 9 wherein each said guide surface has a curved edge and said angle of inclination is variable along said edge.

11. A droplet separator in accordance with claim 8 wherein said vortex generating apparatus further includes a deflection body arranged on a central axis of said jacket downstream of said guide surfaces relative to said main flow direction.

12. A droplet separator in accordance with claim 11 wherein said guide surfaces are arranged between a centrally disposed disc having a predetermined outer diameter and an annular ring having a predetermined inner diameter, and wherein each adjacent pair of said guide surfaces define an outlet opening sufficient to induce a rotational flow in the gas flow around said central axis due to a combined effect through said deflection body and said guide surfaces.

13. A droplet separator in accordance with claim 12 wherein each said guide surface is connected to and extends between said disc and said annular ring and is bent.

14. A droplet separator in accordance with claim 13, wherein said guide surfaces are integral with said disc and said annular ring.

15. A droplet separator in accordance with claim 12 wherein said inner diameter of said annular ring has a value of from 150 mm to 250 mm.

16. A droplet separator in accordance with claim 11 wherein said deflection body is one of a conical shape and a plate shape and an outlet opening defined between said deflection body and said guide surfaces is at least 20% smaller than an inlet opening defined between said guide surfaces.

17. A droplet separator in accordance with claim 16 wherein the number of said guide surfaces is larger than 3 and smaller than 13.

18. A droplet separator in accordance with claim 16 wherein each said guide surface includes an angle of inclination with said inlet area which is larger than 20° and smaller than 70°.

19. A droplet separator in accordance with claim 16 wherein each said guide surface has at least two planar part surfaces inclined with respect to one another.

20. A droplet separator in accordance with claim 11 wherein said deflection body is conical and has a cone angle matching upper edges of said guide surfaces and is secured to said upper edges.

21. A droplet separator comprising
a jacket defining a central flow passage for a flow of a droplet-carrying gas in a main flow direction;
an apertured plate secured across a bottom of said jacket for passage of a droplet-carrying gas into said central flow passage;
a vortex generation apparatus in said central flow passage for setting the droplet-carrying gas into a rotary movement whereby droplets in the droplet-carrying gas are directed by centrifugal force in a radial direction relative to said flow passage and at least some of the droplet-carrying gas is deflected from the main flow direction radially outwardly; and
at least one annular separator element disposed concentrically outside said jacket downstream of said vortex generation apparatus for receiving the droplet-carrying gas therein, said separator element including a plurality of grid-like structures for separating droplets from the droplet-carrying gas passing there through.

22. A droplet separator comprising
a jacket defining a central flow passage for a flow of a droplet-carrying gas in a main flow direction and having a plurality of openings therein;
a vortex generation apparatus in said central flow passage for setting the droplet-carrying gas into a rotary movement whereby droplets in the droplet-carrying gas are directed by centrifugal force in a radial direction relative to said flow passage and at least some of the droplet-carrying gas is deflected from the main flow direction radially outwardly; and
a plurality of annular separator elements connected sequentially in said main flow direction downstream of said vortex generation apparatus and about said jacket for receiving the droplet-carrying gas therein, each said separator element being in communication with respective openings of said openings in said jacket to receive the droplet-carrying gas and including a plurality of grid-like structures for separating droplets from the droplet-carrying gas passing there through.

\* \* \* \* \*

UNITED STATES PATENT AND TRADEMARK OFFICE
CERTIFICATE OF CORRECTION

| | | |
|---|---|---|
| PATENT NO. | : 7,857,879 B2 | Page 1 of 1 |
| APPLICATION NO. | : 11/982966 | |
| DATED | : December 28, 2010 | |
| INVENTOR(S) | : Daniel Egger | |

It is certified that error appears in the above-identified patent and that said Letters Patent is hereby corrected as shown below:

Column 13, line 64, "650" should be -- 65° --

Signed and Sealed this
Eighth Day of March, 2011

David J. Kappos
*Director of the United States Patent and Trademark Office*